(12) United States Patent
Berent et al.

(10) Patent No.: US 9,357,178 B1
(45) Date of Patent: May 31, 2016

(54) VIDEO-REVENUE PREDICTION TOOL

(75) Inventors: Jesse Berent, Kuesnacht (CH); Luciano Sbaiz, Thalwil (CH)

(73) Assignee: GOOGLE INC., Mountain View, CA (US)

( * ) Notice: Subject to any disclaimer, the term of this patent is extended or adjusted under 35 U.S.C. 154(b) by 386 days.

(21) Appl. No.: 13/601,073

(22) Filed: Aug. 31, 2012

(51) Int. Cl.
*H04N 7/16* (2011.01)
*H04N 7/173* (2011.01)

(52) U.S. Cl.
CPC ................... *H04N 7/17309* (2013.01)

(58) Field of Classification Search
USPC ..................... 705/14.55, 35; 725/1
See application file for complete search history.

(56) References Cited

U.S. PATENT DOCUMENTS

| | | | |
|---|---|---|---|
| 2008/0275763 A1* | 11/2008 | Tran et al. | 705/10 |
| 2012/0042338 A1* | 2/2012 | Kitts et al. | 725/35 |
| 2012/0166316 A1* | 6/2012 | Messina et al. | 705/27.1 |
| 2012/0209963 A1* | 8/2012 | Patel et al. | 709/219 |
| 2012/0215640 A1* | 8/2012 | Ramer et al. | 705/14.55 |

* cited by examiner

*Primary Examiner* — Gigi L Dubasky
(74) *Attorney, Agent, or Firm* — Lowenstein Sandler LLP

(57) ABSTRACT

Described herein are techniques related to prediction of video revenue for non-monetized videos. This Abstract is submitted with the understanding that it will not be used to interpret or limit the scope and meaning of the claims. A video-revenue prediction tool predicts revenue for non-monetized videos using historical revenue data of monetized videos.

30 Claims, 4 Drawing Sheets

VIDEO-REVENUE PREDICTION TOOL

BACKGROUND

Video distribution systems allow people and companies to upload videos for viewing by others. Some of the uploaded videos are monetized and some are not. That is, video distribution systems typically have monetization programs that allow video uploaders to generate income when their videos are viewed. However, some of the videos are not yet monetized, even though they could be.

SUMMARY

In general, one implementation of the subject matter disclosed herein is directed to a video-revenue prediction tool. The video-revenue prediction tool includes a monetized-video selection module that is configured to select a set of monetized videos from a corpus of monetized videos. The set of monetized videos includes revenue that is generated for each video in the set of monetized videos.

The video-revenue prediction tool also includes a feature extractor that is configured to extract features from the set of monetized videos and to combine the extracted features into a training-set feature vector. The video-revenue prediction tool includes a model estimator that is configured to map the training-set feature vector to the historical revenue data for each video for the training-set feature vector.

The video-revenue prediction tool includes a non-monetized-video selection module that is configured to select a set of non-monetized videos from a corpus of non-monetized videos. The feature extractor is further configured to extract features from the set of non-monetized videos and to combine the extracted features into a non-monetized video feature vector.

The video-revenue prediction tool includes a revenue predictor that is configured to yield a predicted revenue of the set of non-monetized videos based at least in part upon the non-monetized video feature vector.

The video-revenue prediction tool also includes an uploader selector that is configured to determine whether to invite an uploader of a non-monetized video to monetize the uploader's non-monetized video based at least in part on the predicted revenue of the set of non-monetized videos. In response to a determination to invite the uploader of the non-monetized video to monetize the uploader's non-monetized video, the uploader selector is further configured to invite the uploader to monetize the non-monetized video.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
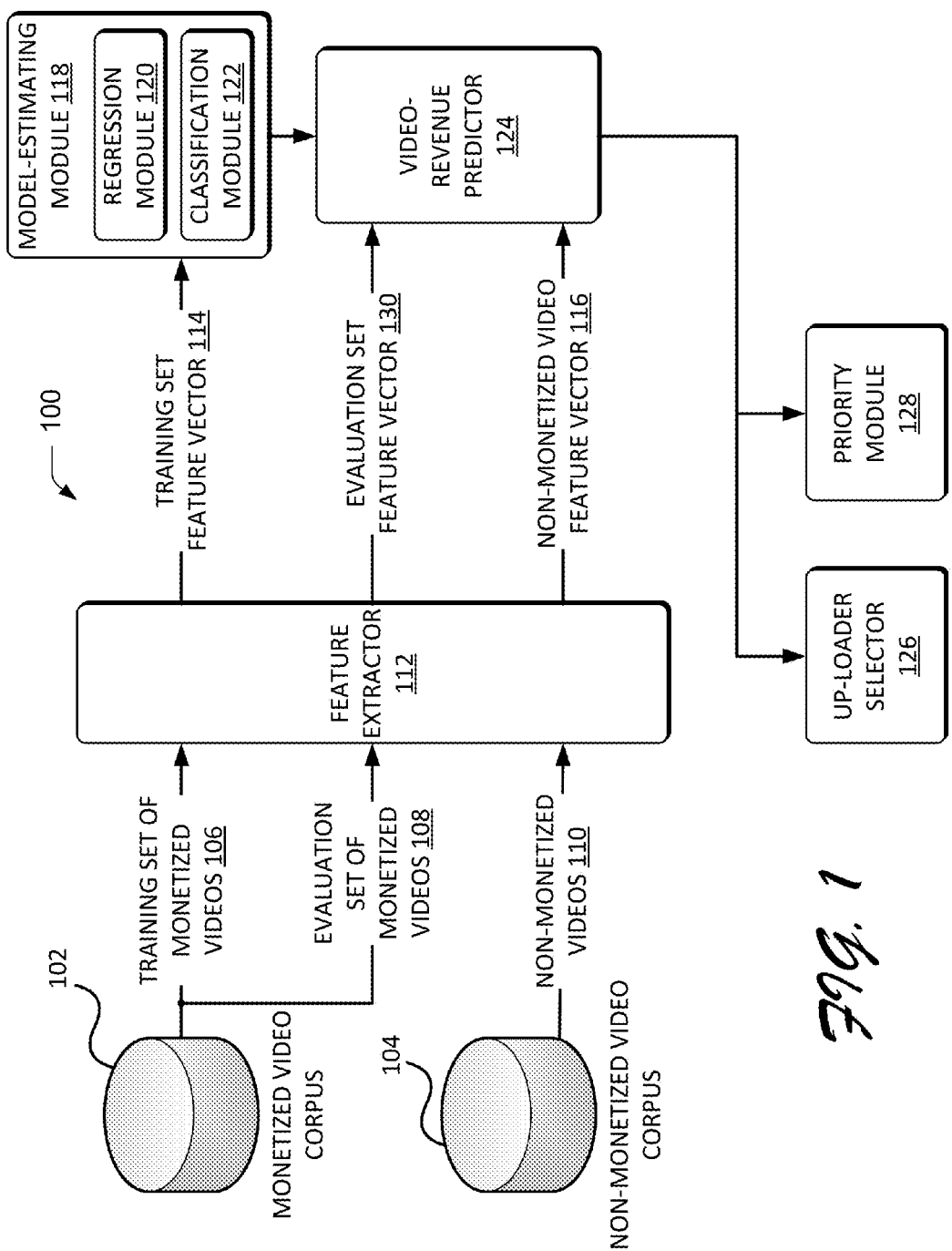
FIG. 1 illustrates an example video-revenue prediction tool according to one or more implementations described herein.

The technology described herein includes a video-revenue prediction tool that uses machine-learning to predict how much revenue per impression one or more non-monetized videos may generate based on historical revenue data and features extracted from videos that have been uploaded to a video hosting service and have already been monetized. As used herein, the term "revenue per impression" is intended to represent predicted earnings for a non-monetized video for every viewing of the non-monetized video if the non-monetized video were to become monetized.

Revenue per impression also may be used in the context of revenue per one thousand impressions, or revenue per mille (RPM). RPM is quantified as $$RPM = \frac{revenue}{number\ of\ video\ views} \times 1000$$

Features extracted from the monetized videos and their associated revenue are the training data used to train a model estimator to predict revenue for one or more non-monetized videos. The training data also may be used to train the model estimator to classify one or more non-monetized videos as potential high revenue generators and/or low revenue generators. The predicted revenue and/or classifications for the non-monetized videos are used to invite uploaders of non-monetized videos to monetize their videos and/or to prioritize the process used to review non-monetized videos for monetization.

In one or more implementations described herein, the video-revenue prediction tool includes a corpus of monetized videos, a corpus of one or more non-monetized videos, a feature extractor, a model-estimating module, a video revenue predictor, an uploader selector, and a priority module. The model-estimating module includes a regression module and a classification module.

The corpus of monetized videos includes of videos that have been uploaded to a video hosting system. The monetized videos already have revenue history. The monetized videos include attributes and observations about the monetized videos. The attributes and observations are termed features. The features include video text metadata, uploader information, audio-visual content, viewer information, referrer information, viewing page information, and parental guidance information.

Video text metadata includes data such as the title of the video, the description of the video, and keywords. Video text metadata also includes comments on the video made by the uploader of the video as well as made by viewers of the video.

Uploader data is information about the video uploader. Uploader data include information such as the country the uploader is from, the age of the uploader, the gender of the uploader, etc. Other uploader data includes how much revenue is generated by other videos uploaded by the particular uploader, such as who the uploader is, how many other videos the uploader has uploaded, what kind of revenue the other videos are generating, etc. Of course, privacy is an utmost concern. Accordingly, an uploader's data may be anonymized (which means unrelated to their actual identity). Also, uploaders may opt out of data collection relating to the video. Additionally, uploaders optionally may provide additional data, such as demographic data, if desired.

Audio-visual content includes data such as which and/or how many times colors are used in a video, whether or not there is motion in the video, the quality of the audio in the video, whether or not there is music in the video, etc. Other audio-visual content includes information such as the type of video, e.g., a sports video, an educational video, etc.

Viewer information includes the country of origin of a viewer, demographics of the viewer, etc. Again, privacy is an utmost concern. Accordingly, viewer's data may be anonymized (which means unrelated to their actual identity). Viewers also may opt out of data collection relating to viewing of the video. Viewers also may optionally provide additional demographic data, if desired.

Referrer data is information that indicates the web address, webpage, and/or website of a third-party site that requested to view the monetized video. Typical referrers include websites such as Facebook®, www.huffingtonpost.com, and the like. Although the description herein includes hyperlinks and/or other forms of browser-executable codes, the hyperlinks and/or other forms of browser-executable codes are not intended to be active links. Of course, the video-revenue prediction tool ensures that user identifiers are made anonymous and are not connected with user names.

Viewing pages data include data about which web sites are monitoring the video. Typical monitoring web sites include Google Analytics™ by Google Inc., Clicky® Web Analytics by Roxy Software Ltd, and the like.

Parental guidance data include how the video is rated by the Motion Picture Association of America (MPAA): "G—General Audiences. All Ages Admitted;" "PG—Parental Guidance Suggested. Some Material May Not Be Suitable For Children;" "PG-13—Parents Strongly Cautioned. Some Material May Be Inappropriate For Children Under 13;" etc.

The corpus of non-monetized videos includes videos that have no revenue history. The non-monetized videos also include attributes and observations, i.e., features, about the non-monetized videos. As with the monetized videos, the non-monetized video features include video text metadata, uploader information, audio-visual content, viewer information, referrer information, viewing page information, and parental guidance information.

With one or more implementations described herein, the corpus of monetized videos is partitioned into a training set of videos and an evaluation set of videos. The feature extractor extracts features from the training set of monetized videos. The feature extractor also extracts features from the non-monetized videos.

The feature extractor then concatenates the features extracted from the monetized videos into a single training-set feature vector. The feature extractor also concatenates the features extracted from the non-monetized videos into a single non-monetized video feature vector.

In one or more implementations, the model-estimating module uses the training-set feature vector and supervised learning techniques to build/estimate/fit a model that maps extracted features to the revenue associated with those features. The machine learning module can be implemented using regression analysis, classification, etc.

For example, in one or more implementations described herein, the regression module applies regression analysis to the single training-set feature vector to build a model (i.e., the video-revenue predictor) that learns how to predict hypothetical revenue for one or more of the non-monetized videos. Alternatively or in addition to predicting hypothetical revenue, the single training-set feature vector is used to train the classification module to build a model (i.e., the video-revenue predictor) that learns how to separate one or more of the non-monetized videos into different categories, such as potential high-revenue generators and potential low-revenue generators.

In one or more implementations described herein, the video revenue predictor uses the trained model to predict revenue for the set of non-monetized videos.

In one or more implementations, the uploader selector uses the predicted revenue to determine whether to invite an uploader of a particular non-monetized video to monetize the uploader's non-monetized video. If the uploader selector determines that an uploader of the video should be invited to monetize the uploader's non-monetized video, the uploader selector invites the uploader to monetize their video.

In one or more implementations, the priority module uses the predicted revenue to prioritize review of the non-monetized videos. For example, non-monetized videos that are potentially high-revenue generators may be reviewed before the potentially low-revenue generators. Alternatively, non-monetized videos that are potentially low-revenue generators may not be reviewed for monetization at all.

Recall that with one or more implementations described herein, the corpus of monetized videos is partitioned into a training set of videos and an evaluation set of videos. In addition to extracting features from the training set of videos, the feature extractor extracts features from the evaluation set of monetized videos. The feature concatenates the extracted features into a single evaluation-set feature vector. The single evaluation-set feature vector is used to evaluate the performance of the video-revenue predictor. As with the training-set of monetized videos and the non-monetized videos, the typical features include video text metadata, uploader information, audio-visual content, viewer information, referrer information, viewing page information, and parental guidance information.

Example Video-Revenue Prediction Tool

FIG. 1 illustrates an example video-revenue prediction tool 100 according to one or more implementations described herein. In the illustrated implementation, the video-revenue prediction tool 100 includes a corpus 102 of monetized videos, a corpus 104 of non-monetized videos, a training-set of monetized videos 106, an evaluation-set of monetized videos 108, and a set of non-monetized videos 110.

The illustrated video-revenue prediction tool 100 also includes a feature extractor 112, a training-set feature vector 114, a non-monetized video feature vector 116, and a model-estimating module 118. The model-estimating module 118 includes a regression module 120 and a classification module 128.

The illustrated video-revenue prediction tool 100 also includes a video-revenue predictor 124, an up-loader selector 126, a priority module 128, and an evaluation-set feature vector 130.

In one or more implementations, the corpus 102 of monetized videos includes videos that already have revenue history. Videos in the corpus 102 include professional and/or amateur material. Such material includes feature films, television shows, amateur videos, video clips, video games, educational videos, music videos, sports videos, cartoons, anime, and the like.

The monetized videos include one or more attributes and observations known as features. Example features include video text metadata, uploader information, audio-visual content, viewer information, referrer information, viewing page information, and parental guidance information.

In one or more implementations, the corpus 104 of non-monetized videos includes videos that have no revenue history. The non-monetized videos also include one or more attributes and observations known as features. Example features include video text metadata, uploader information, audio-visual content, viewer information, referrer information, viewing page information, and parental guidance information, etc. Features have values associated with them.

In one or more implementations, the corpus 102 of monetized videos and the corpus 104 of non-monetized videos are stored in one or more memory devices.

In one or more implementations, when representing video text metadata in a monetized video, a feature corresponds to descriptive text (e.g., words, portions of words, phonemes, unigrams, word pairs, etc.) in the monetized video. The features also correspond to how important a word is in a monetized video (e.g., term frequency-inverse document frequency (td*-idf)).

The value of the video text metadata feature corresponds to a frequency of occurrences of the feature in the video. For example, if descriptive text in a feature is the word "football" the video text metadata feature value in the monetized video corresponds to the number of times the word "football" in text form appears in the monetized video.

In one or more implementations, when representing uploader information in a monetized video, text features in the monetized video correspond to data such as the country the uploader is from, the age of the uploader, the gender of the uploader, who the uploader is, etc. Numerical features correspond to how much and/or what kind of revenue is generated by other videos uploaded by the particular uploader, how many other videos has the uploader uploaded, etc.

As an example, if an uploader is from Seattle the uploader feature value in the monetized video corresponds to "Seattle=true." Similarly, if an uploader is from New York the uploader feature value in the monetized video corresponds to "NewYork=true."

With respect to audio-visual content, in one or more implementations, when representing audio in a monetized video a feature corresponds to audio signal attributes. Such attributes include whether the video includes music, and if so, what the pitch, timbre, etc., are. In one or more alternative implementations, example attributes include whether the video includes speech, and if so, whether the speaker is male, female, a child, etc., whether there are significant pauses in the speech, what language the speech is in, whether there is voiceover content, etc.

Still other audio attributes include zero-crossing rate, audio signal bandwidth, audio signal spectral centroid, audio signal energy, mel-frequency cepstral coefficients (MFCC), Stabilized Auditory Images (SAIs), audio spectrograms, and the like. The audio features are used to find correlations between the type of audio content and the revenue of the monetized video.

As an example, classical music has SAIs or other audio features that are different than audio features of rock music. The different audio features help to predict that the revenue that a classical music video may generate may be different from the revenue that a rock video may generate. In the monetized video, the audio-visual content feature value corresponds to how many times a particular voice-over artist is included in the monetized video.

In one or more implementations, when representing visual information in a monetized video a feature corresponds to video content attributes. Such attributes include colors, textures, motion, edges, faces, buildings, graphics, text overlaying, etc. Other attributes relate to whether the video includes an indoor scene, an outdoor scene, a city scene, a country scene, a farm scene, a desert scene, an ocean scene, a beach scene, a sporting event, an advertisement, an educational scene, etc."

As an example, the video-revenue prediction tool 100 utilizes motion vectors derived from the pixels in the monetized video to determine whether or not there is a correlation between the movement in the monetized video and the revenue the monetized video generates.

As an example, the viewer information indicates the number of times the monetized video was viewed in a specific country. Thus, if the monetized video was viewed one hundred times in Switzerland, then feature value in the monetized video corresponds to "viewed_in_Switzerland=100."

In one or more implementations, when representing referrer data in a monetized video a feature corresponds to a source that requested to view the monetized video. Attributes include one or more Uniform Resource Locators (URL) and/or the Uniform Resource Identifiers (URI) of the webpage from which a link to the monetized video was followed, such as www.huffingtonpost.com. Other attributes include traffic sources such as social networking websites, such as Facebook®, LinkedIn®, and the like.

For example, if www.huffingtonpost.com is the source of fifty requested views of a monetized videos, then the referrer feature value includes "www.huffingtonpost.com=50." Similarly, if Facebook is the source of one hundred requested views of a monetized videos, then the referrer feature value includes "www.Facebook.com=100."

In one or more implementations, when representing parental guidance information in a monetized video a feature corresponds to data about how the video is rated by the Motion Picture Association of America (MPAA). A monetized video can be rated "G—General Audiences. All Ages Admitted;" "PG—Parental Guidance Suggested. Some Material May Not Be Suitable For Children;" "PG-13—Parents Strongly Cautioned. Some Material May Be Inappropriate For Children Under 13;" "R—Restricted. Children Under 17 Require Accompanying Parent or Adult Guardian;" or "NC-17—No One 17 and Under Admitted."

For example, if a monetized video is rated "G—General Audiences. All Ages Admitted," then the Parental Guidance feature value corresponds to "g=true." Similarly, if a monetized video is rated ""PG-13—Parents Strongly Cautioned. Some Material May Be Inappropriate For Children Under 13;" then the Parental Guidance feature value corresponds to "pg13=true."

With one or more implementations described herein, the video-revenue prediction tool 100 partitions the monetized videos into the training set of monetized videos 106 and the evaluation set of monetized videos 108. For example, the video-revenue prediction tool 100 may partition the monetized videos as follows: eighty percent of the monetized videos for the training set of monetized videos and twenty percent of the monetized videos for the evaluation set of monetized videos. Alternatively, the video-revenue prediction tool 100 may partition the monetized videos as follows: seventy percent of the monetized videos for the training set of monetized videos and thirty percent of the monetized videos for the evaluation set of monetized videos. Of course, for other implementations any ratio of training set monetized videos to evaluation set of monetized videos may be used.

In one or more implementations, the feature extractor 112 extracts features from the monetized videos and aggregates and/or concatenates the features extracted from the monetized videos into the training-set feature vector 114. For example, if one feature (f1) has values v1, v2, v3, and another feature (f2) has values w1, w2, w3, then the concatenated feature vector (f) is f=[v1, v2, v3, w1, w2, w3].

In one or more implementations, the feature extractor 112 utilizes one or more open source feature extraction toolkits to extract features and to concatenate the features into the training-set feature vector 114. Alternative implementations utilize one or more proprietary feature extraction toolkits. Feature extraction tools and/or techniques include Fourier-based feature extraction, wavelet-based feature extraction, histograms, audio spectrograms, motion detection, etc. Entities suitable for implementing the feature extractor 112 include MATLAB® by The Math Works, Inc., SciLab® by INRIA, Python®-based toolkits by Python Software Foundation (PSF), and the like.

In one or more implementations, the feature extractor 112 aggregates the features of the monetized videos by computing histograms for entries of a particular feature. For example, if the feature is uploader information, a histogram of the monetized videos uploaded by the particular uploader is computed. The histogram represents a map between the revenue for the monetized video and the number of monetized videos.

In one or more implementations, the feature extractor 112 computes statistics on each histogram in order to obtain a training-set feature vector 114 of a fixed length. Typical statistics include a minimum and maximum value for the extracted features, a mean value for the extracted features, a standard deviation value for the extracted features, an entropy value for the extracted features, etc. In one or more implementations, the numerical values for the statistics are normalized to take into account the range of possible values. For ease of discussion, the resulting normalized features are referred to as features rather than normalized features, it being understood that normalization may have been performed.

In one or more implementations, the feature extractor 112 concatenates the feature vectors extracted from the selected monetized videos into a single feature vector and builds pairs that include the feature vector histogram and the revenue for the feature vector. For example, a pair including the video text metadata feature and its associated revenue is a training example for the model-estimating module 118, a pair including the referrer data feature and its associated revenue is a training example for the model-estimating module 118, the pair including the uploader data feature and its associated revenue is a training example for the model-estimating module 118, etc. The feature extractor 112 concatenates the training examples into the training-set feature vector 106.

In one or more implementations, the model-estimating module 118 uses the training-set feature vector 114 and supervised learning techniques to build/estimate/fit a model that maps extracted monetized video features to the revenue associated with those features. In alternative implementations, the model-estimating module 118 uses the unsupervised learning techniques, speedup learning techniques, etc., to build/estimate/fit the prediction model.

For one or more implementations described herein, the training-set feature vector 114 is the training data that the model-estimating module 118 uses to build the video-revenue predictor 124. Entities suitable for implementing the model-estimating module 118 include MATLAB® by The Math Works, Inc., SciLab® by INRIA, Python®-based toolkits by Python Software Foundation (PSF), Google Prediction API™ Service, and the like.

The model-estimating module 118 can be implemented using regression analysis. To accomplish regression analysis, the illustrated model-estimating module 118 includes the regression module 120. The regression module 120 applies regression analysis to the training-set feature vector 114 in order to build a model (i.e., the video-revenue predictor 124) that learns how to predict hypothetical revenue for one or more of the non-monetized videos. In one or more implementations, the regression module 128 includes a linear regressor, a logistical regressor, a regression vector machine (RVM), or the like.

In implementations in which the regression module 120 includes a linear regressor, the regression module 120 fits the training-set feature vector 114 to the revenue for that feature in a straight line to enable the video-revenue predictor 124 to predict revenue for non-monetized videos.

In implementations in which the regression module 120 includes a logistical regressor, the regression module 120 uses known revenue data gathered from the monetized videos as ground truth data. The ground truth data is used to train the video-revenue predictor 110 to predict revenue for the non-monetized videos.

In implementations in which the video-revenue prediction tool 100 utilizes the regression module 120 to predict revenue for a non-monetized video, the training-set feature vector 114 is mapped to a single number using the video revenue predictor 124. The single number is the predicted revenue for the non-monetized video. For example, assume that the regression module implements linear regression and that the training-set feature vector 114 is a two-dimensional feature vector v1, v2. The predicted revenue would be $a1*v1+a2*v2$, where a1 and a2 are parameters that are estimated during training of the video-revenue predictor 124.

The model-estimating module 118 can be implemented using classification techniques. To accomplish classification, the illustrated model-estimating module 118 includes the classification module 122. In one or more implementations, the training-set feature vector 114 is used to train the classification module 122 to build a model (i.e., the video-revenue predictor) that learns how to separate one or more of the non-monetized videos into different categories. The categories include non-monetized videos that are potential high-revenue generators and non-monetized videos that are potential low-revenue generators.

In one or more implementations, the classification module 122 utilizes decision tree techniques, perceptron-based methods, and/or other suitable classification techniques.

In implementations in which the video-revenue prediction tool 100 utilizes the classification module 122 to classify a non-monetized video as a potentially high-revenue generator or a potentially low-revenue generator, the classification module 122 divides the feature space of the training-set feature vector 114 into regions. The divisor for the classification module 122 is $N-1$, where N represents the number of dimensions of the feature space. Thus, if the feature space is two-dimensional then the divisor is $N-1$, or one, and the classifier module 122 is a linear classifier that separates the feature space into two regions. In this scenario, the training-set feature vector 114 is a two-dimensional feature vector v1, v2. The classifier module 122 computes $a1*v1+a2*v2=s$, where a1 and a2 are parameters that are estimated during training of the video-revenue predictor 124 and where s is the score. The classification module 122 than applies a threshold to the score, s, to determine whether the non-monetized video is classified as high-revenue generating or not-high-revenue generating.

The model-estimating module 118 may be implemented using techniques other than the linear regression, logistical regression, and/or classification. For example, with some implementations described herein non-linear models are used where various products of the components of the training-set feature vector 114 are formed and then appended to the training-set feature vector 114 to provide a feature vector of larger dimension. Then, classification and/or regression are applied to the higher-dimensioned vector.

The non-monetized videos in the corpus 104 also include one or more attributes and observations known as features. The features include among other things video text metadata, uploader information, audio-visual content, viewer information, referrer information, viewing page information, and parental guidance information. In one or more implementations, the feature extractor 112 also extracts features from the non-monetized videos and aggregates and/or concatenates the features extracted from the non-monetized videos into the non-monetized video feature vector 116. The non-monetized video feature vector 116 is an n-dimensional vector of numerical values for the features that represent a non-monetized video.

In one or more implementations, the video-revenue predictor 124 uses the non-monetized video feature vector 116 to predict hypothetical revenue per impression for one or more of the non-monetized videos. Alternatively, the video-revenue predictor 124 predicts hypothetical revenue per one thousand impressions for the non-monetized videos. Alternatively still, the video-revenue predictor 124 uses the non-monetized video feature vector 116 to classify the non-monetized videos (e.g., into potentially high-revenue generating videos and potentially low-revenue generating videos).

In one or more implementations, the uploader selector 126 utilizes the predictions from the video-revenue predictor 124 to determine whether to invite an uploader of a non-monetized video to monetize their video. If the uploader selector 126 determines that a particular non-monetized video is suitable for monetization, then the uploader selector invites the uploader to join a monetization program, for example, that allows the uploader to generate revenue for his or her video.

The uploader selector 126 may include one or more suitable video monetization programs to determine whether to invite an uploader of a non-monetized video to monetize their video. In this example, if the uploader selector 126 determines that a particular non-monetized video is suitable for monetization, then the video monetization program invites the uploader to monetize his or her video.

In one or more implementations, the priority module 128 utilizes the predictions from the video-revenue predictor 124 to determine an order in which to review a non-monetized video for potential monetization. For example, the priority module 128 reviews non-monetized videos that are predicted to be potential high-revenue generators before non-monetized videos that are predicted to be potential low-revenue generators.

In one or more implementations, the evaluation-set feature vector 130 is used to evaluate the performance of the video revenue predictor 124. For example, in the case of regression the mean squared error of the predictions that the video-revenue predictor 124 makes for the samples in the evaluation set of monetized videos is measured. In the case of classification, the probability that the video-revenue predictor 124 predicts the correct sub-set (e.g., low-revenue versus high-revenue) is measured.

Example Video-Revenue Prediction Tool Operation

Figure 2:
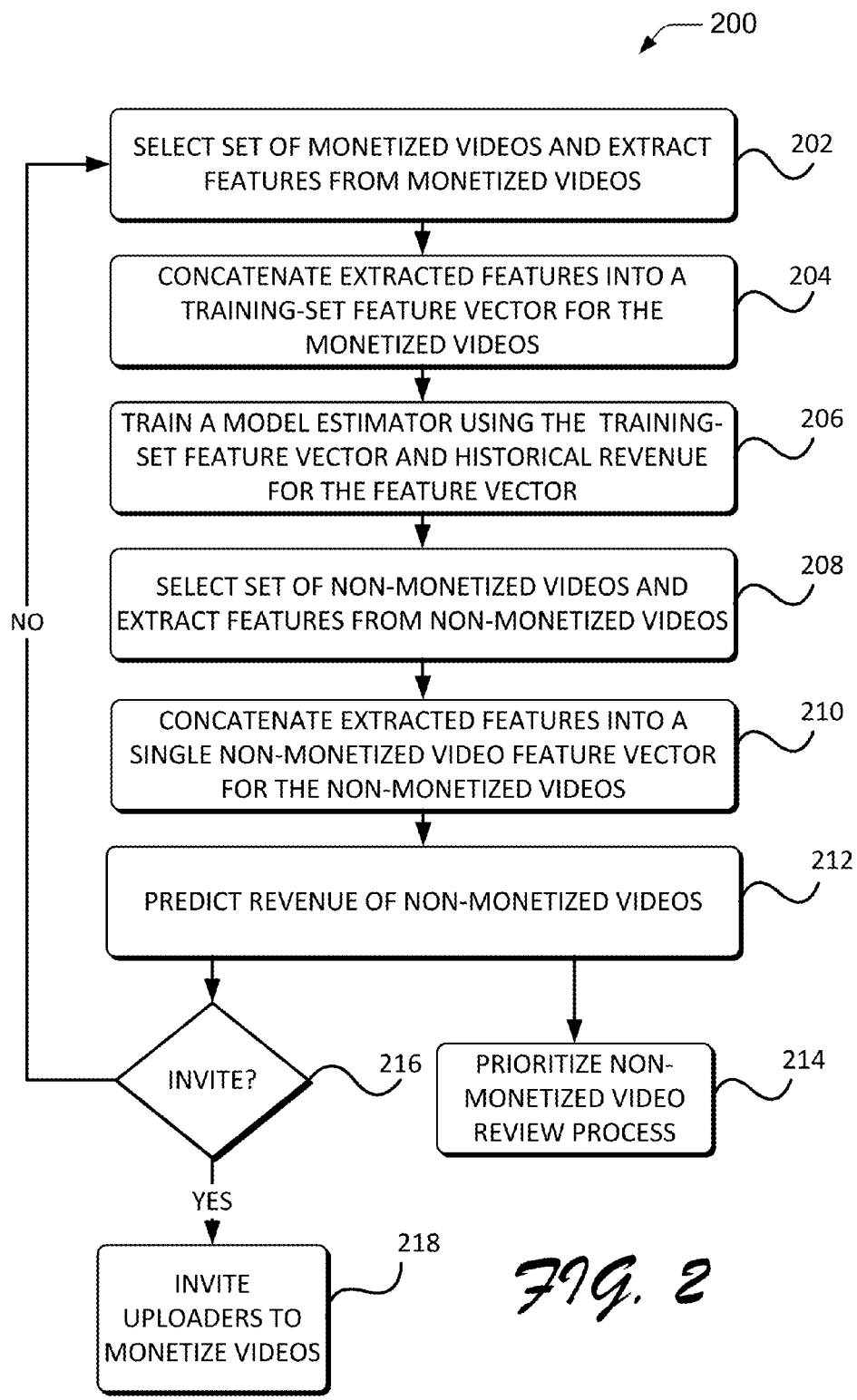
FIG. 2 is a flowchart of a method performed by the video-revenue prediction tool according to one or more implementations described herein.

FIG. 2 is a flowchart of a method 200 performed by a video-revenue prediction tool 100 according to one or more implementations described herein. With one or more implementations described herein, the video-revenue prediction tool 100 predicts revenue for non-monetized videos using historical revenue data from monetized videos.

In a block 202, the video-revenue prediction tool 100 selects a set of monetized videos and extracts features from the set of monetized videos. In one or more implementations, the video-revenue prediction tool 100 selects a set of monetized videos from the corpus 102 of monetized videos and the feature extractor 112 extracts features from the set of monetized videos. Typical features include video text metadata, uploader information, audio-visual content, viewer information, referrer information, viewing page information, and parental guidance information In a block 204, the video-revenue prediction tool 100 concatenates the extracted features into a single training-set feature vector for each monetized video. In one or more implementations, the feature extractor 112 concatenates the features from the set of monetized videos into the training-set feature vector 114.

In a block 206, the video-revenue prediction tool 100 trains a model estimator using the single training-set feature vector and associated historical revenue data. In one or more implementations, the model-estimating module 118 maps the training-set feature vector 114 to historical revenue data that is associated with the appropriate component/feature of the training-set feature vector 114. For example, viewer components of the training-set feature vector 114 are mapped to the historical revenue associated with viewer components. Similarly, the historical revenue associated with a particular type of video is mapped to the type of video data.

In a block 208, the video-revenue prediction tool 100 selects a set of non-monetized videos and extracts features from the set of non-monetized videos. In one or more implementations, the video-revenue prediction tool 100 selects a set of non-monetized videos from the corpus 104 and the feature extractor 112 extracts features from the set of non-monetized videos. The non-monetized videos do not include historical revenue data associated with them because they have not yet been monetized.

In a block 210, the video-revenue prediction tool 100 concatenates the extracted features into a single non-monetized video feature vector for each monetized video. In one or more implementations, the feature extractor 112 concatenates the features extracted from the set of non-monetized videos into the non-monetized feature vector 116.

In a block 212, the video-revenue prediction tool 100 predicts revenue for the set of non-monetized videos. In one or more implementations, the video-revenue predictor 124 generates predicted revenue for the set of non-monetized videos using the non-monetized feature vector 116.

In a block 214, the video-revenue prediction tool 100 prioritizes review of non-monetized videos for purposes of determining whether to monetize the non-monetized videos. In one or more implementations, the priority module 128 utilizes the predictions from the video-revenue predictor 124 to determine an order in which to review a non-monetized video for potential monetization. For example, the priority module 128 reviews non-monetized videos that are predicted to be potential high-revenue generators before non-monetized videos that are predicted to be potential low-revenue generators.

In a block 216, the video-revenue prediction tool 100 determines whether to invite an uploader to monetize a non-monetized video. In one or more implementations, the uploader selector 126 utilizes the predictions from the video-revenue predictor 124 to determine whether to invite an uploader of a non-monetized video to monetize his or her video. If it is determined not to invite the uploader to monetize his or her video, control of the method 200 returns to block and another set of monetized videos is selected for processing for monetization.

If in block 216 the video-revenue prediction tool determines that an uploader of a non-monetized video is to be invited to monetize a video, then control of the method 200 passes to a block 218. In block 218, the video-revenue prediction tool 10 invites the uploader of the non-monetized video to monetize his or her video. In one or more implementations, the uploader selector 126 invites the uploader to join a monetization program, for example, that allows the uploader to generate revenue for his or her video.

As an alternative example, the video-revenue prediction tool 100 operates by obtaining a set of monetized videos from the corpus 102 of monetized videos and obtaining a set of non-monetized videos from the corpus 104 of non-monetized videos. Each of the videos of the set of monetized videos includes features and revenue. Each of the videos of the set of non-monetized videos includes features but no revenue.

The video-revenue prediction tool 100 analyzes the obtained monetized videos and non-monetized videos. The video-revenue prediction tool 100 determines correlations between the features of the videos of the set of monetized videos and the features of the videos of the set of non-monetized videos. Based upon the correlations, video-revenue prediction tool 100 predicts revenue of the videos of set of non-monetized videos.

Using the predicted revenue, the video-revenue prediction tool 100 determines whether to invite an up-loader of a non-monetized video to monetize the up-loader's non-monetized video. In response to determining that the up-loader of the non-monetized video should be invited to monetize the up-loaded non-monetized video, the video-revenue prediction tool 100 invites the up-loader to monetize the up-loader's non-monetized video.

Example Video-Revenue Prediction Tool Performance Evaluation

Figure 3:
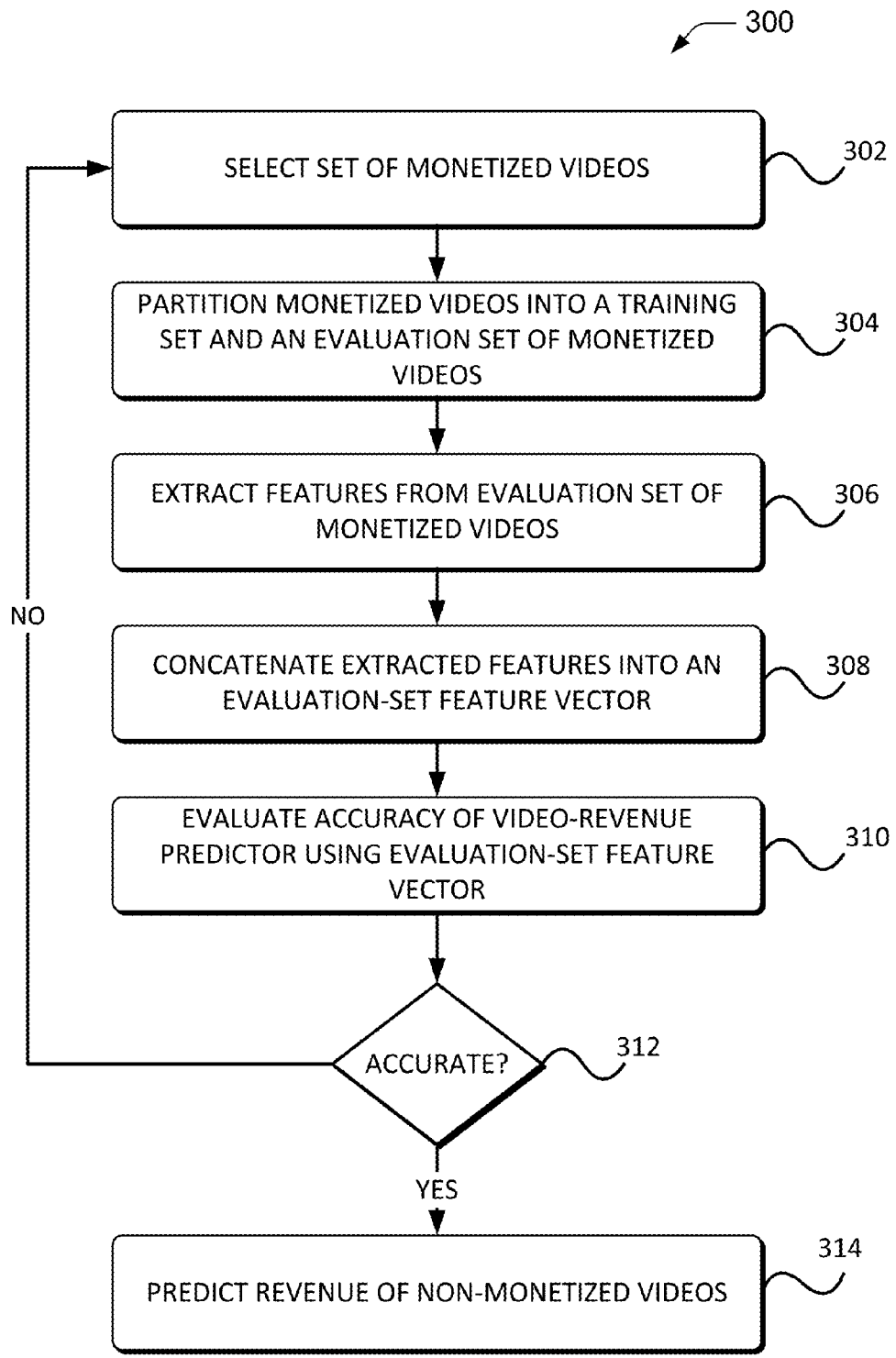
FIG. 3 is a flowchart of a method performed by the video-revenue prediction tool according to one or more implementations described herein.

FIG. 3 is a flowchart of a method 300 performed by a video-revenue prediction tool 100 according to one or more implementations described herein. With one or more implementations described herein, the video-revenue prediction tool 100 evaluates the performance of the video-revenue predictor 124.

In a block 302, the video-revenue prediction tool 100 selects a set of monetized videos. With one or more implementations described herein, the video-revenue prediction tool 100 selects a set of monetized videos from the corpus 102 of monetized videos.

In a block 304, the video-revenue prediction tool 100 partitions the set of monetized videos into a training set of monetized videos and an evaluation set of monetized videos. With one or more implementations described herein, the monetized videos selected from the corpus 102 are partitioned into the training set of monetized videos 106 and the evaluation set of monetized videos 108.

In a block 306, the video-revenue prediction tool 100 extracts features from the evaluation set of monetized videos. With one or more implementations described herein, the feature extractor 112 extracts features from the evaluation set of monetized videos 108.

In a block 308, the video-revenue prediction tool 100 concatenates the features extracted from the evaluation set of monetized videos into a single feature vector. With one or more implementations described herein, the feature extractor 112 concatenates the features extracted from the evaluation set of monetized videos 108 into the evaluation-set feature vector 130.

In a block 310, the video-revenue prediction tool 100 evaluates the accuracy/performance of the video-revenue predictor 124 using the single evaluation-set feature vector. With one or more implementations described herein, the evaluation-set feature vector 130 evaluates the ability of the video-revenue predictor 124 to accurately predict revenue for the one or more non-monetized videos 110. With one or more implementations described herein, the evaluation-set feature vector 130 evaluates the ability of the video-revenue predictor 124 to accurately predict a classification for the one or more non-monetized videos 110.

In a block 312, the video-revenue prediction tool 100 determines whether performance of the video-revenue predictor 124 is accurate. If in block 312 it is determined that the performance of the video-revenue is accurate, then control of the method 300 passes to a block 314.

In a block 314, the video-revenue prediction tool 100 predicts revenue for one or more non-monetized videos. With one of more implementations described herein, the video-revenue predictor 124 uses the non-monetized video feature vector 116 to predict revenue for the non-monetized videos 110. With one or more implementations described herein, the video-revenue predictor 124 uses the non-monetized video feature vector 116 to classify the one or more non-monetized videos 110 into categories.

If in block 312, the video-revenue prediction tool 100 determines that performance of the video-revenue predictor 124 is not accurate (e.g., the model-estimating module 118 has over-fit or under-fit the video-revenue predictor 124, then control of the method 300 passes to block 302, and the method 300 repeats.

The process 200 and 300 are illustrated as a collection of actions in a logical flow graph, which represents a sequence of operations that can be implemented in mechanics alone or a combination with hardware, software, and/or firmware. In the context of software/firmware, the actions represent instructions stored on one or more computer-readable storage media that, when executed by one or more processors, perform the recited operations. Note that the order in which the processes are described is not intended to be construed as a limitation, and any number of the described process blocks can be combined in any order to implement the processes or an alternate process. Additionally, individual actions may be deleted from the processes without departing from the spirit and scope of the subject matter described herein.

Example Computing Environment

Figure 4:
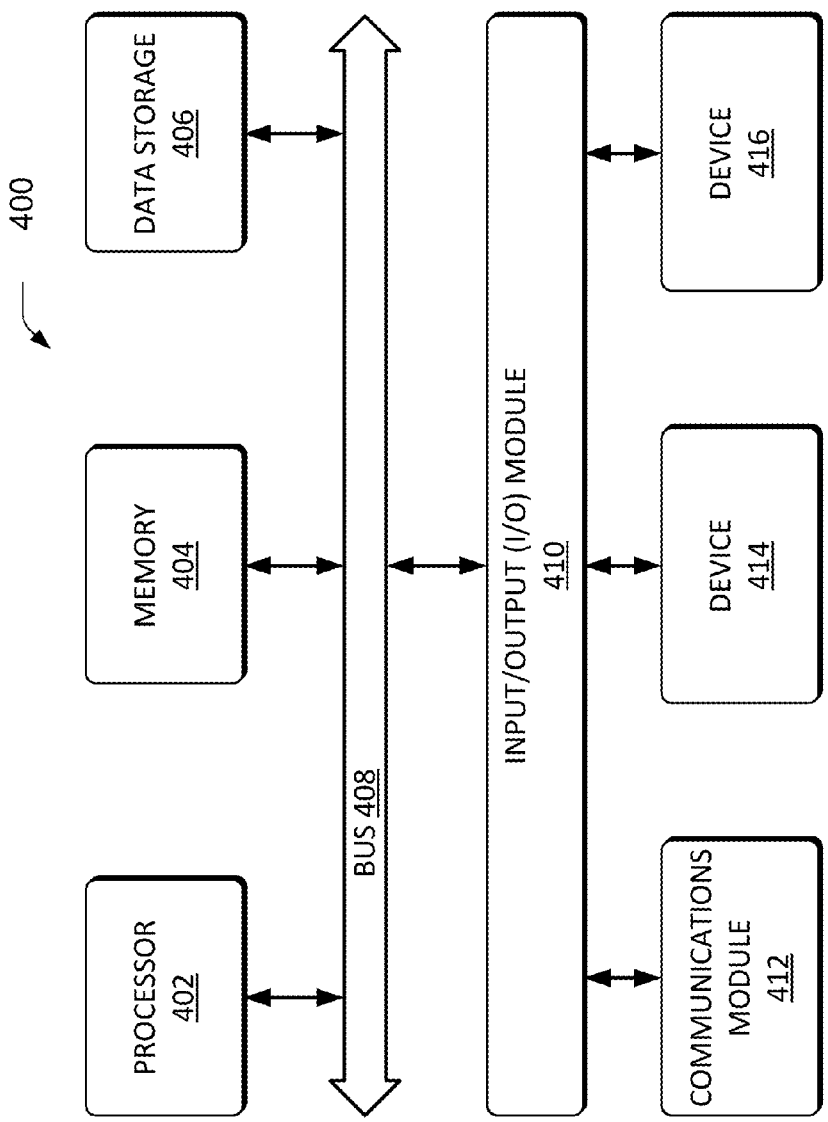
FIG. 4 is a high-level block diagram illustrating an example computer system suitable for implementing the technology described herein.

FIG. 4 is a high-level block diagram illustrating an example computer system 400 suitable for implementing the video-revenue prediction tool of FIG. 1. In certain aspects, the computer system 400 may be implemented using hardware or a combination of software and hardware.

The illustrated computer system 400 includes a processor 402, a memory 404, and data storage 406 coupled to a bus 408 or other communication mechanism for communicating information. An input/output (I/O) module 410 is also coupled to the bus 408. A communications module 412, a device 414, and a device 416 are coupled to the I/O module 410.

The processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processor 402 may be used for processing information. The processor 402 can be supplemented by, or incorporated in, special purpose logic circuitry.

The memory 404 may be Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device used for storing information, a computer program, and/or instructions to be executed by the processor 402. They memory 404 may store code that creates an execution environment for one or more computer programs used to implement technology described herein.

A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Unless indicated otherwise by the context, a module refers to a component that is hardware, firmware, and/or a combination thereof with software (e.g., a computer program.) A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The instructions may be implemented in one or more computer program products, i.e., one or more modules of computer program instructions encoded on one or more computer readable media for execution by, or to control the operation of, the computer system 400, and according to any method well known to those of skill in the art. The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM))

The data storage 406 may be a magnetic disk or optical disk, for example. The data storage 406 may function to store information and instructions to be used by the processor 402 and other components in the computer system 400.

The bus 408 may be any suitable mechanism that allows information to be exchanged between components coupled to the bus 408. For example, the bus 408 may be transmission media such as coaxial cables, copper wire, and fiber optics, optical signals, and the like.

The I/O module 410 can be any input/output module. Example input/output modules 410 include data ports such as Universal Serial Bus (USB) ports.

The communications module 412 may include networking interface cards, such as Ethernet cards and modems.

The device 414 may be an input device. Example devices 414 include a keyboard, a pointing device, a mouse, or a trackball, by which a user can provide input to the computer system 400.

The device 416 may be an output device. Example devices 416 include displays such as cathode ray tubes (CRT) or liquid crystal display (LCD) monitors that display information, such as webpages, for example, to the user.

One or more implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

For example, it will be appreciated that several of the above-disclosed and other features and functions, or alternatives thereof, may be combined into many other different systems or applications. Also, it will be appreciated that various presently unforeseen or unanticipated alternatives, modifications, variations or improvements therein may be subsequently made by those skilled in the art, which are also intended to be encompassed by the claims that follow.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:

1. A video-revenue prediction tool comprising:
   a memory that is configured to store a set of monetized videos and historical revenue for each video in the set of monetized videos, wherein the memory is further configured to store a set of non-monetized videos, each monetized video having revenue history;
   a feature extractor that is configured to extract one or more features from each monetized video in the set of monetized videos and to combine the features extracted from each monetized video into a training-set feature vector, wherein the feature extractor is further configured to extract one or more features from each non-monetized video in the set of non-monetized videos and to combine the features extracted from each non-monetized video into a non-monetized video feature vector for each non-monetized video, each non-monetized video having no revenue history;

a model-estimating module that is configured to map the training-set feature vector to the historical revenue for each monetized video for the training-set feature vector;

a video-revenue predictor that is configured to yield a predicted revenue for each non-monetized video in the set of non-monetized videos based at least in part upon the training-set feature vector and the mapping between the training-set feature vector and the historical revenue; and an up-loader selector that is configured to determine whether to invite an uploader of a non-monetized video to monetize the up-loaded non-monetized video based at least in part on the predicted revenue of the up-loaded non-monetized video, and wherein, in response to a determination to invite the up-loader of the non-monetized video to monetize the up-loaded non-monetized video, the up-loader selector is further configured to invite the up-loader to monetize the up-loaded non-monetized video.

2. A video-revenue prediction tool according to claim 1 wherein the extracted features include metadata for text included in each monetized video and each non-monetized video.

3. A video-revenue prediction tool according to claim 1 wherein the extracted features include referrer data that indicates one or more third-parties that requested to view each monetized video and each non-monetized video.

4. A video-revenue prediction tool according to claim 1 wherein the extracted features include data about the up-loader of each monetized video and each non-monetized video.

5. A video-revenue prediction tool according to claim 1 wherein the extracted features include data about a parental guidance rating for each monetized video and each non-monetized video.

6. A video-revenue prediction tool according to claim 1 wherein the extracted features include data about video.

7. A video-revenue prediction tool according to claim 1 wherein the extracted features include data on which web sites are monitoring each monetized video and each non-monetized video.

8. A video-revenue prediction tool according to claim 1 wherein the extracted features include data about audio-visual content for each monetized video and each non-monetized video.

9. A video-revenue prediction tool according to claim 1 wherein the extracted features include numerical feature values and text feature values.

10. A video-revenue prediction tool according to claim 1 wherein the model-estimating module includes a linear regressor.

11. A video-revenue prediction tool according to claim 1 wherein the model-estimating module includes a logistical regressor.

12. A video-revenue prediction tool according to claim 1 wherein the model-estimating module includes a classifier.

13. A video-revenue prediction tool according to claim 1 wherein the model-estimating module includes at least one of a support vector machine (SVM) and a regression vector machine (RVM).

14. A video-revenue prediction tool according to claim 1 wherein the feature extractor is further configured to extract one or more features from each monetized video in the set of monetized videos and to combine the features extracted from each monetized video into an evaluation-set feature vector, and to evaluate performance of the revenue-prediction model using the evaluation-set feature vector.

15. A video-revenue prediction tool according to claim 1 further comprising a priority module that is configured to prioritize a non-monetized video review process based at least in part on the predicted revenue for each video in the set of non-monetized videos.

16. A video-revenue prediction tool according to claim 1 wherein the feature extractor combines the extracted features into the training-set feature vector by concatenating the extracted features into a training-set feature vector.

17. A video-revenue prediction tool according to claim 1 wherein the feature extractor combines the extracted features into the evaluation-set feature vector by concatenating the extracted features into an evaluation-set feature vector.

18. A method comprising:
obtaining a set of monetized videos from a corpus of monetized videos, each monetized video having revenue history;

extracting features from each video in the set of monetized videos and combining the extracted features into a training-set feature vector for each video in the set of monetized videos;

mapping the training-set feature vector to revenue history for the training-set feature vector;

selecting a set of non-monetized videos from a corpus of non-monetized videos, each non-monetized video having no revenue history;

extracting features from each video in the set of non-monetized videos;

concatenating the extracted features into a non-monetized video feature vector for each video in the set of non-monetized videos;

using the training-set feature vector and the mapping, predicting revenue for each video in the set of non-monetized videos;

based at least in part on the predicted revenue for each videos in the non-monetized set of videos, determining whether to invite an up-loader of a non-monetized video to monetize the up-loader's non-monetized video; and in response to determining to invite the up-loader of the non-monetized video to monetize the up-loader's non-monetized video, inviting the up-loader to monetize the non-monetized video.

19. A method according to claim 18 wherein extracting features from the set of non-monetized videos includes extracting at least one of metadata for text included in each monetized video and each non-monetized video, data that indicates one or more third-parties that requested to view each monetized video and each non-monetized video, data about the up-loader of each monetized video and each non-monetized video, data about a parental guidance rating for each monetized video and each non-monetized video, data about third-parties that are monitoring each monetized video and each non-monetized video, data on which web sites are monitoring each monetized video and each non-monetized video, and data about audio-visual content for each monetized video and each non-monetized video.

20. A method according to claim 18 further comprising:
combining the extracted features into an evaluation-set feature vector; and
evaluating performance of the revenue-prediction model using the evaluation-set feature vector.

21. A method according to claim 18 further comprising prioritizing a non-monetized video review process using the predicted revenue of each video in the set of non-monetized videos.

22. A video-revenue prediction tool comprising:
a memory that is configured to store a set of monetized videos and historical revenue for each video in the set of monetized videos, wherein the memory is further configured to store a set of non-monetized videos;
a feature extractor that is configured to extract one or more features from each monetized video in the set of monetized videos and to combine the features extracted from each monetized video into a training-set feature vector, wherein the feature extractor is further configured to extract one or more features from each non-monetized video in the set of non-monetized videos and to combine the features extracted from each non-monetized video into a non-monetized video feature vector;
a model-estimating module that is configured to map the training-set feature vector to the historical revenue for each monetized video for the training-set feature vector;
a video-revenue predictor that is configured to yield a predicted revenue for each non-monetized video in the set of non-monetized videos based at least in part upon the training-set feature vector and the mapping between the training-set feature vector and the historical revenue; and
a priority module that is configured to prioritize a non-monetized video review process based at least in part on the predicted revenue of the set of non-monetized videos.

23. A video-revenue prediction tool according to claim 22 wherein extracting features from the set of non-monetized videos includes extracting at least one of metadata for text included in each monetized video and each non-monetized video, data that indicates one or more third-parties that requested to view each monetized video and each non-monetized video, data about the up-loader of each monetized video and each non-monetized video, data about a parental guidance rating for each monetized video and each non-monetized video, data about third-parties that are monitoring each monetized video and each non-monetized video, data on which web sites are monitoring each monetized video and each non-monetized video, and data about audio-visual content for each monetized video and each non-monetized video.

24. A video-revenue prediction tool according to claim 22 wherein the feature extractor combines the extracted features into the training-set feature vector by concatenating the extracted features into a training-set feature vector.

25. A video-revenue prediction tool according to claim 22 wherein the feature extractor includes at least one of a histogram, a motion detector, and an audio spectrogram.

26. A video-revenue prediction tool according to claim 22 wherein the model-estimating module includes at least one of a linear regressor, a logistical regressor, a classifier, support vector machine (SVM), and a regression vector machine (RVM).

27. A non-transitory computer-readable medium comprising instructions, which when executed by a processing device, cause the processing device to perform operations comprising:
obtaining a set of monetized videos from a corpus of monetized videos, each monetized video having revenue history;
extracting features from each video in the set of monetized videos and combining the extracted features into a training-set feature vector for each video in the set of monetized videos;
mapping the training-set feature vector to revenue history for the training-set feature vector;
selecting a set of non-monetized videos from a corpus of non-monetized videos, each non-monetized video having no revenue history;
extracting features from each video in the set of non-monetized videos;
concatenating the extracted features into a non-monetized video feature vector for each video in the set of non-monetized videos;
using the training-set feature vector and the mapping, predicting revenue for each video in the set of non-monetized videos;
based at least in part on the predicted revenue for each videos in the non-monetized set of videos, determining whether to invite an up-loader of a non-monetized video to monetize the up-loader's non-monetized video; and
in response to determining to invite the up-loader of the non-monetized video to monetize the up-loader's non-monetized video, inviting the up-loader to monetize the non-monetized video.

28. A non-transitory computer-readable medium according to claim 27 wherein extracting features from the set of non-monetized videos includes extracting at least one of metadata for text included in each monetized video and each non-monetized video, data that indicates one or more third-parties that requested to view each monetized video and each non-monetized video, data about the up-loader of each monetized video and each non-monetized video, data about a parental guidance rating for each monetized video and each non-monetized video, data about third-parties that are monitoring each monetized video and each non-monetized video, data on which web sites are monitoring each monetized video and each non-monetized video, and data about audio-visual content for each monetized video and each non-monetized video.

29. A non-transitory computer-readable medium according to claim 27 wherein the operations further comprise:
combining the extracted features into an evaluation-set feature vector; and
evaluating performance of the revenue-prediction model using the evaluation-set feature vector.

30. A non-transitory computer-readable medium according to claim 18 wherein the operations further comprise prioritizing a non-monetized video review process using the predicted revenue of each video in the set of non-monetized videos.

* * * * *